United States Patent [19]
Müller et al.

[11] Patent Number: 5,400,867
[45] Date of Patent: Mar. 28, 1995

[54] RESTRAINING SYSTEM FOR OCCUPANTS OF A MOTOR VEHICLE

[75] Inventors: Manfred Müller, Deizisau; Wolfgang Henseler, Tübingen; Egon Katz, Nagold; Guido Wetzel, Böblingen, all of Germany

[73] Assignee: Mercedes-Benz AG, Stuttgart, Germany

[21] Appl. No.: 57,664

[22] Filed: May 5, 1993

[30] Foreign Application Priority Data

May 23, 1992 [DE] Germany .................. 42 17 172.5

[51] Int. Cl.⁶ .............................................. B60R 21/26
[52] U.S. Cl. ............................. 180/268; 280/735; 280/736
[58] Field of Search ............... 180/268, 270; 280/733, 280/734, 735, 736, 741, 742

[56] References Cited

U.S. PATENT DOCUMENTS

| | | | |
|---|---|---|---|
| 3,624,601 | 11/1971 | Routzahn et al. | 180/270 |
| 4,018,457 | 4/1977 | Marlow | 280/735 |
| 4,026,580 | 5/1977 | Wulf et al. | 280/736 |
| 4,620,721 | 11/1986 | Scholz et al. | 280/735 |
| 5,172,790 | 12/1992 | Ishikawa et al. | 180/268 |
| 5,174,600 | 12/1992 | Jahn et al. | 180/268 |
| 5,257,818 | 11/1993 | Steffens, Jr. | 280/736 |

FOREIGN PATENT DOCUMENTS

| | | |
|---|---|---|
| 0284770 | 2/1988 | European Pat. Off. . |
| 2120043 | 4/1978 | Germany . |
| 3413768 | 7/1985 | Germany . |
| 3702825 | 1/1987 | Germany . |
| 4032757 | 4/1992 | Germany . |
| 4113954 | 4/1992 | Japan ........................ 280/735 |

*Primary Examiner*—Margaret A. Focarino
*Assistant Examiner*—Peter C. English
*Attorney, Agent, or Firm*—Evenson, McKeown, Edwards & Lenahan

[57] ABSTRACT

The invention relates to a restraining system for occupants of a motor vehicle. The occupant is safeguarded by a safety belt and an airbag. So that the inflation pressure of the airbag can be controlled according to whether the occupant is strapped in or not, the gas generator of the airbag possesses a heater which switches on when the belt is not fastened and which is intended for increasing the inflation pressure which can be generated.

4 Claims, 1 Drawing Sheet

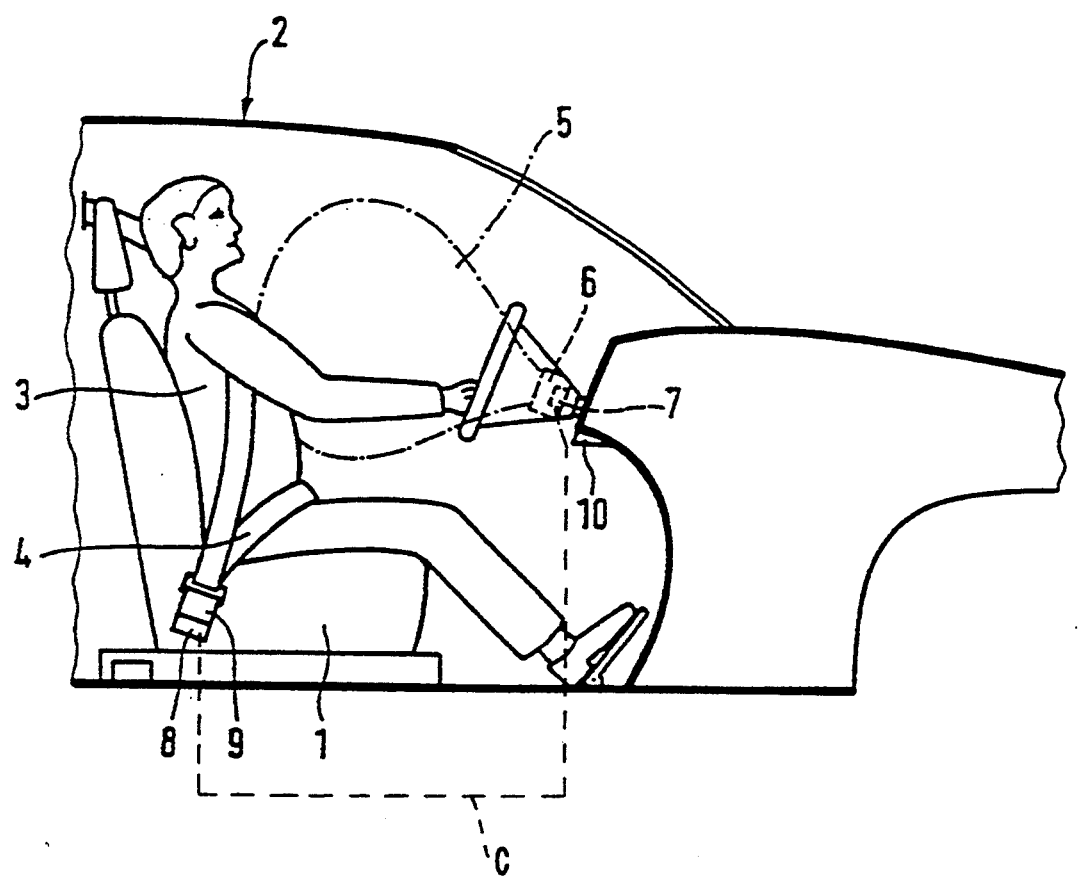

RESTRAINING SYSTEM FOR OCCUPANTS OF A MOTOR VEHICLE

BACKGROUND AND SUMMARY OF THE INVENTION

The invention relates to a restraining system for occupants of a motor vehicle, with an inflatable airbag which is assigned to the occupant in combination with a safety belt and which, in the event of an accident to the motor vehicle, is automatically inflated by means of a gas generator with pressure controllable in dependence on the fastening state of the belt.

A corresponding restraining system is known from German Published Application No. 4,032,757. Here, inflation pressure of an airbag serving as an impact-protection cushion for a motor-vehicle occupant is controlled in dependence on the fastening state of a safety belt by means of two separately activatable gas generators.

It is known from German Patent Specification 3,413,768 to make the gas generator of an airbag two-stage, in the event of an accident the first stage being ignited at a relatively low impact speed of the vehicle, whilst the ignition of the second stage takes place only at a higher impact speed. In this way, the airbag is inflated comparatively weakly at a lower impact speed and to a greater extent at a higher impact speed.

A further restraining system with an airbag is known from German Published Application No. 3,702,825, and in this, in the event of an accident, the gas generator of the airbag is already ignited at a relatively low impact speed, if the particular occupant has not fastened the safety belt. In contrast, with the belt fastened, the ignition of the gas generator takes place only at an increased impact speed.

It is known from German Patent Specification 2,120,043 to maintain the gas generator at a substantially constant operating temperature by means of heating, so that the inflation pressure of the airbag has a value which can be reproduced with particular accuracy.

An object of the invention is, in a restraining system of the type mentioned in the introduction, to guarantee in an especially simple way in terms of construction that, in the event of an accident, the airbag is inflated differently, depending on whether the particular occupant has fastened the safety belt or not.

This object is achieved according to the invention in that the gas generator possesses a heater which switches on only when the belt is not fastened.

The invention is based on the generally known fact that the airbag should be inflated with reduced pressure only when the particular occupant has fastened the safety belt, in order as far as possible to avoid the risk of minor facial injuries which can occur when the occupants head strikes the airbag. On the other hand, it is necessary to guarantee that the airbag is inflated with increased pressure if the occupant has not fastened the belt; for in this case, sufficient safety of the occupant can be guaranteed only by means of increased pressure and possible minor facial injuries must be allowed for.

In order to guarantee the mode of operation of the airbag or gas generator which differs according to the use of the belt, the invention makes use of the fact that the inflation pressure of the airbag clearly depends on the temperature of the gas generator. Now according to the invention, this effect, which has been disturbing in previous airbag systems, is utilized for controlling the inflation pressure, by providing for a heater which remains switched off when the belt is fastened and is switched on when the belt is not fastened, so that a reduced inflation pressure is guaranteed in the first instance and an increased inflation pressure in the second instance.

In an embodiment which is expedient in terms of construction, the safety belt has a belt buckle which is coupled to a switch which then itself switches on the heater when the belt is not locked in the belt buckle and switches off the heater when the belt is locked in the belt buckle.

The switch is expediently arranged in series with an operating switch of the vehicle engine, so that the heater can be switched on by the switch only when the vehicle engine is running.

Other objects, advantages and novel features of the present invention will become apparent from the following detailed description of the invention when considered in conjunction with the accompanying drawings.

BRIEF DESCRIPTION OF THE DRAWINGS

The single drawing FIGURE shows a schematic vertical longitudinal section through a passenger car having the restraining system according to the invention.

DETAILED DESCRIPTION OF THE DRAWINGS

An occupant 3 occupying a front seat 1 of a passenger car 2 is safeguarded, on the one hand, by a safety belt 4 and, on the other hand, by an airbag 5 which, in the event of an accident, is inflated automatically by means of a gas generator 6. The corresponding control of the gas generator 6 takes place via an acceleration sensor (not shown) or the like which is arranged on the passenger car 2.

The gas generator 6 possesses an electrical heater 7 which is switched on and off by means of a switch 8 coupled to the belt buckle 9 of the safety belt 4 in such a way that the heater 7 is switched on when the belt 4 is not locked in the belt buckle 9 and is switched off when the belt 4 is locked in the belt buckle 9.

The inflation pressure of the airbag 5 which can be generated by the gas generator 6 is varied by the heater 7, that is to say the inflation pressure is increased when the heater 7 is switched on, whereas only a reduced inflation pressure can be obtained when the heater 7 is not switched on.

This can guarantee that, with the belt 4 fastened, in the event of an accident the airbag 5 is inflated only with reduced pressure, as is desired. In contrast, if the belt 4 has not been fastened, the airbag 5 works with increased inflation pressure, such as is necessary for an occupant 3 who is not strapped in, in order to guarantee his safety to a sufficient degree.

The switch 8 can be arranged electrically in series with an operating switch 10 (ignition lock), as schematically depicted by circuit C, by means of which the engine of the vehicle is switched on and off. This guarantees that, in the appropriate switching position of the switch 8, the heater 7 can be activated only with the vehicle engine switched on or the engine ignition switched on.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. Restraining system for an occupant of a motor vehicle comprising:
   a selectively fastenable safety belt,
   an inflatable airbag,
   a gas generator connected to and opening into the airbag for automatically inflating the airbag in the event of an accident activating an acceleration sensor which triggers the gas generator,
   a selectively operable heater disposed at the gas generator for heating the gas generator to increase airbag inflation pressure generated by the gas generator when the heater is on as compared to when the heater is off, and
   a control switch disposed in a circuit supplying electricity to the heater independent of the acceleration sensor, said control switch being coupled to the safety belt so as to operate the heater to heat the gas generator only when the safety belt is not fastened, thereby assuring increased airbag inflation pressure in the event of an accident when the seatbelt is not fastened as compared to when the seatbelt is fastened.

2. Restraining system according to claim 1, wherein the safety belt includes a belt buckle which is coupled to the control switch such that the control switch operates the heater when the belt is not locked in the belt buckle and shuts off the heater when the belt is locked in the belt buckle.

3. Restraining system according to claim 2, wherein the control switch is connected in series with an operating ignition switch for a vehicle engine such that the heater can be switched on only with the vehicle engine ready for operation.

4. Restraining system according to claim 1, wherein the control switch is connected in series with an operating ignition switch for a vehicle engine such that the heater can be switched on only with the vehicle engine ready for operation.

* * * * *